US007590064B1

United States Patent
Zhang et al.

(10) Patent No.: US 7,590,064 B1
(45) Date of Patent: Sep. 15, 2009

(54) METHOD AND SYSTEM OF FLOW CONTROL IN MULTI-HOP WIRELESS ACCESS NETWORKS

(75) Inventors: Hang Zhang, Nepean (CA); Shalini Periyalwar, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 851 days.

(21) Appl. No.: 10/894,037

(22) Filed: Jul. 20, 2004

(51) Int. Cl.
*G01R 31/08* (2006.01)
*H04B 7/14* (2006.01)
(52) U.S. Cl. .................. 370/235; 370/236; 370/315
(58) Field of Classification Search ............... None
See application file for complete search history.

(56) References Cited

U.S. PATENT DOCUMENTS

| | | | |
|---|---|---|---|
| 2003/0198184 A1* | 10/2003 | Huang et al. | 370/231 |
| 2004/0221052 A1* | 11/2004 | Ramasubramanian et al. | 709/230 |
| 2005/0259663 A1* | 11/2005 | Ode et al. | 370/395.4 |
| 2007/0183321 A1* | 8/2007 | Takeda et al. | 370/229 |
| 2007/0223383 A1* | 9/2007 | Kamath et al. | 370/236 |

\* cited by examiner

*Primary Examiner*—Kwang B Yao
*Assistant Examiner*—Jutai Kao
(74) *Attorney, Agent, or Firm*—Withrow & Terranova, P.L.L.C.

(57) ABSTRACT

A system, method and relay transceiver for multi-hop wireless communications. In the relay, there is a receiver for adapted to receive packets on a first wireless link collectively destined for at least one mobile terminal. The transmitter buffers them and then transmits the packets on a second wireless link. A flow control function is implemented to provide flow control over the first wireless link to limit an amount buffered in the relay transceiver for a given mobile terminal.

13 Claims, 8 Drawing Sheets

METHOD AND SYSTEM OF FLOW CONTROL IN MULTI-HOP WIRELESS ACCESS NETWORKS

FIELD OF THE INVENTION

The invention relates to wireless multi-hop access networks.

BACKGROUND OF THE INVENTION

In conventional cellular wireless access networks, a cell is covered by a BTS (base station transceiver) and all mobile terminals communicate with the BTS directly. With the addition of relay transceivers, hereinafter simply "relays", a multi-hop network including the BTS, relay nodes and mobile terminals, is set up. With relay nodes involved, the coverage of a wireless access network is improved. In such a wireless access network, there may be multiple routes for the communication between a terminal and network to take. For example a terminal can communicate directly with the BTS or indirectly via one or more relay nodes.

An example of a two-hop scenario is shown in FIG. 1. Shown is a base station 10 having a coverage area 12, and a relay 16 having a coverage area 18. There is a link 22 between the base station 10 and the relay 16 which is typically a high capacity and very reliable wireless link. Shown are a number of mobile terminals 14 communicating directly with the BTS 10, and a number of mobile terminals 20 communicating with the relay 16 which relays communications for these mobile terminals to and from the BTS 10.

In such a network, the fixed relay node 16 is added to improve the coverage in the edge of a cell/BTS. Since the relay is a fixed node, the channel between the BTS 10 and the relay can be a high quality channel implemented using any one of many advanced channel technologies, such as MIMO, which can provide improved capacity. However, the quality of the channel between the relay node 16 and a mobile terminal 20 is typically lower and less stable due to the mobility of the mobile terminal. Because of this, it is possible that data will accumulate in the relay after having been transmitted over the reliable channel between the BTS and the relay. This requires that the relay node have a significant buffer capacity, particularly in the case where a long delay bound is allowed, and there are a lot of mobile terminals that are served by the relay.

SUMMARY OF THE INVENTION

According to one broad aspect, the invention provides a relay transceiver comprising: a receiver adapted to receive packets on a first wireless link collectively destined for at least one mobile terminal; a transmitter adapted to transmit the packets on a second wireless link; a buffer adapted to buffer the packets between their receipt and transmission; a flow control function adapted to participate in flow control over the first wireless link to limit an amount buffered in the relay transceiver for a given mobile terminal.

In some embodiments, the flow control function is adapted to transmit a message when the number of packets reaches a threshold.

In some embodiments, the threshold is selected to substantially guarantee the buffer will be emptied within a predetermined time.

In some embodiments, the threshold is based on $\alpha$ R Tc, where Tc is the predetermined time, R is a minimum data rate on the second wireless link, and $\alpha$ is an average availability of the second wireless link for transmitting to a given mobile terminal.

In some embodiments, flow control function is adapted to allow the buffer to be emptied prior to completing a handoff.

In some embodiments, flow control function is adapted to allow the buffer to be emptied prior to a mobile terminal generating a layer 2 NACK the relay being adapted for use with mobile terminals that are configured to delay generating layer 2 NACKs for a predetermined time.

According to another broad aspect, the invention provides a system comprising: a first transceiver and a relay transceiver according to claim 1 transceiver; wherein: the first transceiver is adapted to transmit packets to the relay transceiver on the first wireless link, each packet being destined for one of said at least one of mobile terminal; the relay transceiver is adapted to receive packets from the first transceiver on the first wireless link, to buffer the packets, and to transmit the packets on a second wireless link; and the first transceiver and relay transceiver perform flow control to limit an amount buffered in the relay transceiver for a given mobile terminal.

In some embodiments, the first transceiver and relay transceiver perform flow control to limit size of the buffer in the relay transceiver for a given mobile terminal by: the relay transceiver transmitting a message to the first transceiver when an amount buffered for a given mobile terminal reaches a predetermined threshold.

In some embodiments, in response to receiving the message, the first transceiver stops transmitting packets to the relay transceiver for the given mobile terminal.

In some embodiments, the threshold is selected to substantially guarantee the buffer will be emptied within a predetermined time.

In some embodiments, the threshold is based on $\alpha$ R Tc, where Tc is the predetermined time, R is a minimum data rate on the second wireless link, and alpha is an average availability of the second wireless link for transmitting to a given mobile terminal.

In some embodiments, a system is further adapted to: initiate a handoff to a second transceiver; executing the handoff after giving the relay transceiver time to empty its buffer.

In some embodiments, the flow control is performed to substantially guarantee the buffer will be able to be emptied prior to completing the handoff.

In some embodiments, a system for use with a mobile terminal adapted to delay sending a layer 2 NACK due to packet mis-ordering the system further adapted to transmit one of a pair of consecutive packets for a given mobile terminal directly from the first transceiver, and to transmit a second of the pair of consecutive packets from the first transceiver via the relay transceiver; wherein the threshold is selected to substantially guarantee the buffer can be emptied before the mobile terminal is expected to generate a layer 2 NACK due to mis-ordering of received packets.

According to another broad aspect, the invention provides a mobile terminal adapted to receive packets directly from a first transceiver and to receive packets indirectly from the first transceiver via a relay transceiver, the mobile terminal being further adapted to: detect a gap in a received packet flow; upon detecting a gap in the received packet flow, wait a period of time for the gap to be filled before transmitting a control message indicating occurrence of the gap.

In some embodiments, the period of time set to be long enough for a relay transceiver to empty its buffer.

In some embodiments, the message is a layer 2 NACK.

According to another broad aspect, the invention provides a base station for providing wireless communication to at least one mobile terminal via a relay transceiver, the base station comprising: a flow control function adapted to participate in flow control of packets transmitted to a given mobile terminal via the relay transceiver; wherein the flow control function is selected to substantially guarantee the relay transceiver will be able to send all buffered packets within a predetermined time.

In some embodiments, a base station further comprises: initiate a handoff to a second transceiver; execute the handoff after giving the relay transceiver time to empty its buffer.

In some embodiments, the flow control is performed to substantially guarantee the buffer will be able to be emptied prior to completing the handoff.

Another broad aspect provides a method involving, at a relay, receiving packets over a first wireless hop forming part of a multi-hop communications path; at the relay, buffering the packets for transmission on a second wireless hop forming part of the multi-hop communications path; at the relay, transmitting the packets on the second wireless hop; and performing flow control over the first wireless hop to limit an amount buffered for transmission on the second wireless hop.

In a first method, performing flow control over the first wireless hop to limit an amount buffered for transmission on the second wireless hop comprises: the relay periodically reporting a buffer status an upstream transmitter of the packets; the upstream transmitter transmitting the packets as a function of the buffer status so as to limit the amount buffered.

In a second method, performing flow control over the first wireless hop to limit an amount buffered for transmission on the second wireless hop comprises: when the amount buffered reaches a stop point, the relay reporting that this has occurred to an upstream transmitter of the packets; when the amount buffered drops to a resume point, the relay reporting that this has occurred to the upstream transmitter of the packets; the upstream transmitter refraining from transmitting new packets to the relay in respect of the multi-hop communications path between receipt of the stop point report and the resume point report.

In a third method, performing flow control over the first wireless hop to limit an amount buffered for transmission on the second wireless hop comprises: the relay sending a first report to an upstream transmitter of the packets when amount buffered reaches a first stop point; in response to the first report, the upstream transmitter refraining from transmitting new packets for some time and then automatically resuming transmitting new packets; if after resuming, the relay detects that the amount buffered is still above the stop point, the relay sending a second report to the upstream transmitter in response to which the upstream transmitter stops transmitting new packets.

In a fourth method, performing flow control over the first wireless hop to limit an amount buffered for transmission on the second wireless hop comprises: the relay maintaining an estimate of an expected throughput for the second wireless hop and periodically reporting this to an upstream transmitter of the packets; the upstream transmitter of the packets transmitting packets to the relay approximately following the expected throughput.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
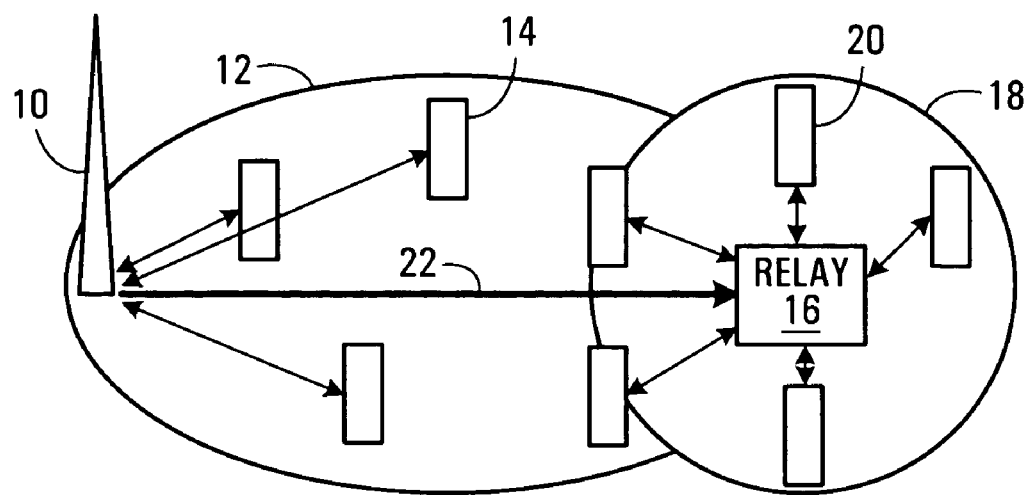
FIG. 1 is an example of a multi-hop wireless network.
Figure 2:
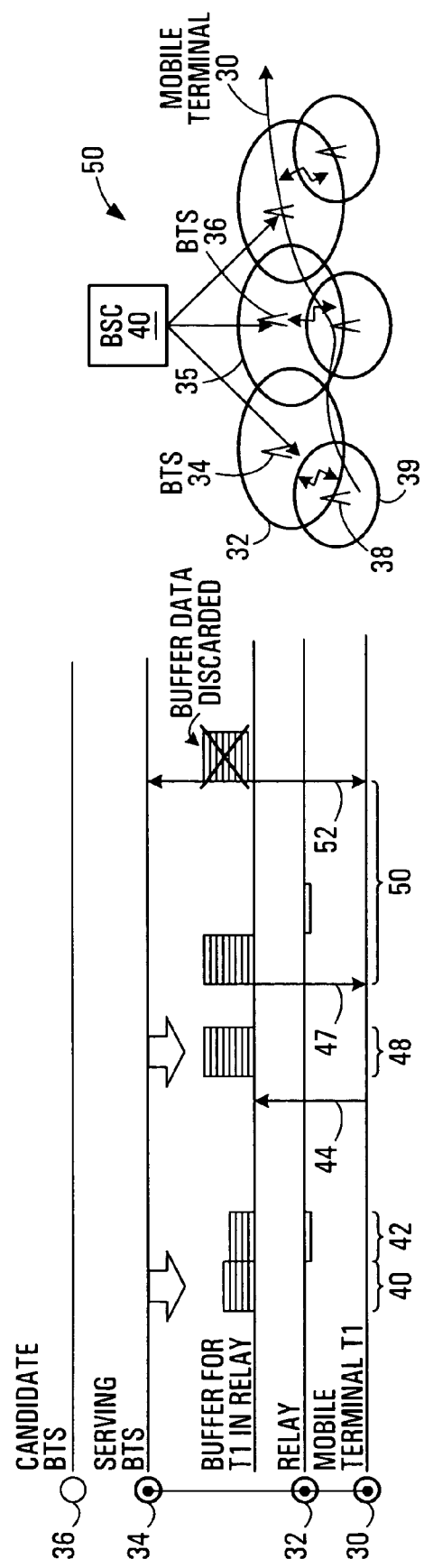
FIG. 2 is a transmission scenario illustrating how data buffered in a relay may be lost after a handoff.

A first problem that may occur in a multi-hop wireless network such as that illustrated in FIG. 1 is the accumulation of packets in the relay which may then need to be discarded when a handoff occurs. An example of this is shown in FIG. 2 which shows signalling between a mobile terminal 30, a relay 32, a serving BTS 34 and a candidate BTS 36. During time 40, the serving BTS 34 is simply forwarding all the data it receives to the relay 32. This is being forwarded by the relay to the mobile terminal 30 on an ongoing basis. One example packet transmission is indicated as occurring during transmission interval 42. Sometime later, a handoff request 44 is generated by the mobile terminal 30. While this is going on, the serving BTS 34 is still transmitting to the relay and as such at time interval 48 there is a larger number of packets which have accumulated. At some point later, a handoff confirmation 47 is sent to the terminal 30. There is only a short time 50 following the handoff confirmation during which the relay 32 can continue to transmit packets to the mobile terminal 30. In the illustrated example, only a single packet is transmitted at the time interval 50. Then, at 52 the mobile terminal 30 starts communicating with the new candidate BTS 36 which now becomes the serving BTS. Now all of the data accumulated in the relay 32 is discarded. The result is that the network will have to re-transmit that data again to the terminal after the handoff in order to achieve lossless transmission. This translates into resource waste and longer packet delay. A schematic view of the network is shown generally indicated at 50. The mobile terminal 30 is shown moving from the coverage area 32 served by BTS 34 into the coverage area 35 of BTS 36. A BSC 40 is shown communicating with each of the BTSs.

With the employment of fixed relays, more than one route exists between the network and a given mobile terminal. The terminal can communicate directly with the BTS, or via one or more fixed relays. Because of this, the route from the mobile terminal to the network can be dynamically selected based on real-time channel considerations. This can be determined by QoS considerations for example. For delay sensitive traffic, the communication should normally be established between the terminal and BTS directly. For non-delay sensitive traffic, the communication can be established between the terminals and the relay if the link between the relay and the terminal is better than the link between the BTS and the terminals.

Figure 3:
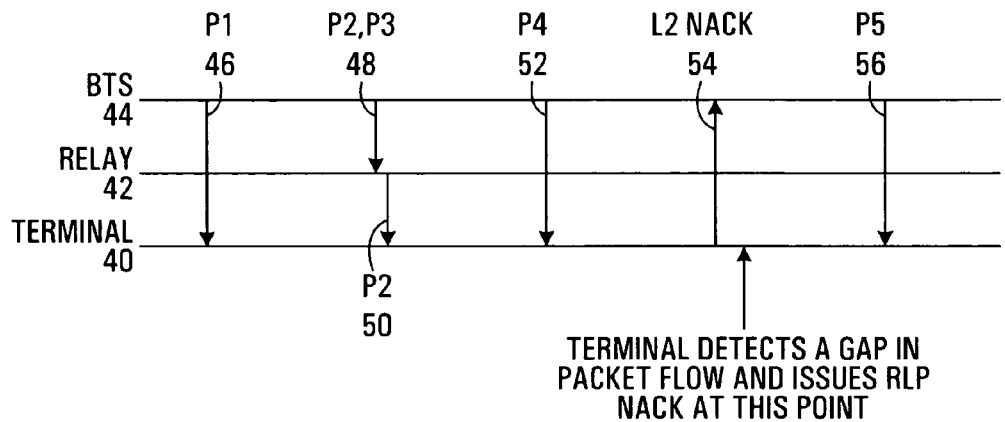
FIG. 3 is a packet flow diagram showing how the use of relays may result in unnecessary packet re-transmission.

A problem which may occur in systems allowing for dynamic routing is that packets may arrive at the mobile terminal out of order. It is possible that a BTS will send a new packet to a mobile terminal directly before the relay has finished sending out all of the packets that it has buffered for the terminal. This may result in a L2 ARQ NACK (automatic repeat request negative ACK) being generated by the mobile terminal which will again result in unnecessary packet re-transmission. An example of this is shown in FIG. 3 which shows a terminal 40, a relay 42 and a BTS 44. A first packet P1 46 is transmitted by the BTS 44 directly to the terminal 40. Sometime later, the BTS 44 transmits packets P2, P3 48 to the relay 42. The relay 42 starts forwarding these to the terminal 40, and transmits packet P2 50 to the terminal 40. Sometime later, and before P3 is forwarded by the relay 42, the BTS 44 is shown transmitting P4 52 directly to terminal 40. At this point, the terminal 40 will detect a gap in the packet flow. In particular, packet P4 will have been received immediately after packet P2 without having received packet P3. The terminal detects this gap and immediately issues the RLP NACK 54. This will trigger the re-transmission of packets by the BTS 44. This will occupy transmission resources and will also result in increased delay.

It is noted that some sort of scheme is typically provided in multi-hop networks to avoid self-collision. For example, the relay and a BTS may be scheduled time-wise so as not to transmit to the same receiver simultaneously. Some implementations may use other mechanisms, such as frequency divisional multiplexing.

Also, the relays may be provided to extend the coverage of a cell. Alternatively, they are used for enhanced data rate coverage. In this context, packets can be sent to mobile terminals directly and via the relay for regions served by the relay.

Figure 4:
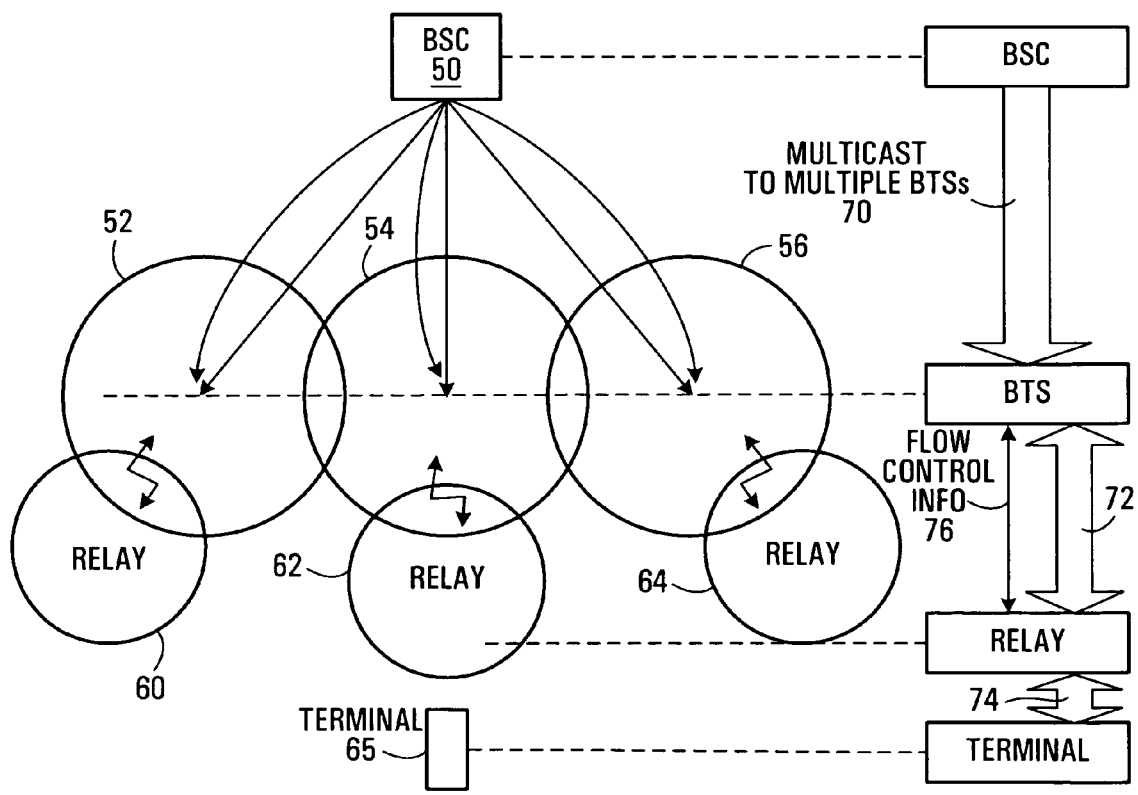
FIG. 4 is a system level diagram showing flow control between a relay and a BTS, as provided by an embodiment of the invention.

Referring to FIG. 4, shown is a high level system diagram of a multi-hop wireless network featuring flow control between the relay and the BTS. Shown is a base station controller 50 responsible for controlling three BTSs 52, 54, 56 illustrated by their coverage areas. Each sector is shown in communication with a respective relay 60, 62, 64 also illustrated by their coverage areas. Each coverage area is served by a respective transceiver forming part of a base station. Base stations may serve multiple sectors, or single sector base stations may be employed. While three BTSs are shown in the example of FIG. 4, this can be extended to an arbitrary number of BTSs. Each BTS in the example of FIG. 4 has a respective relay. More generally, some BTSs and/or sectors of BTSs have relays and some of them may not have relays. A base station controller 50 is shown communicating with the three BTSs 52, 54, 56 in this example. The BSC-BTS is a particular network hierarchy which may not be featured in all wireless multi-hop networks. However, the BTSs and relays may still be provided in other networks as described below.

In operation, the BSC 50 is shown communicating with the BTSs 52, 54, 56 by using multicast transmission 70. This means that each BTS gets a copy of everything that goes to every BTS. Each BTS then communicates with the respective relay on a respective wireless communication path 72 and exchanges flow control information 76. Finally, the relays are shown communicating bi-directionally with terminals as indicated at 74. A single terminal 65 is shown in the diagram. Of course it is to be understood that in a practical implementation there would be a much larger number of terminals and that the number would be changing dynamically as users enter and leave the network or as users turn on and turn off their terminals. Preferably, the wireless links between the BTSs and the relays have relatively high reliability and high capacity compared to the wireless links between the relays and the terminals.

It is noted that while multi-cast is described as an example tool for enabling handoff, not all handoff mechanisms require this. For example there are other mechanisms which make use of context transfer and soft handoff. The flow control mechanisms described herein apply to various handoff mechanisms and not just multi-cast.

Because the link from the BTS to the relay is more reliable than the link from the relay to the terminal, data received from a BTS by a relay cannot always be immediately forwarded to a terminal. For this reason, the relays are provided with a buffering capacity. In accordance with an embodiment of the invention, flow control is implemented between the BTS and the relay to ensure that at any moment, the amount of buffered data does not exceed an upper bound.

In a preferred embodiment, the upper bound is determined based on the following parameters:

a) R=minimum data rate deliverable from a relay to a terminal. This is usually the data rate that would be employed during a handoff of a terminal, and is a function of the set of coding and modulation schemes available. The minimum data rate would be the lowest data rate of all of the available schemes.

b) $\alpha$=average resource availability during a scheduling interval. This refers to the average amount of transmit capacity from a given relay that can be dedicated to the particular receiver. This will usually take into account the capacity being occupied by other users.

c) Tc=buffer clear-up time. This is the amount of time to be made available to clear-up the data buffer by sending out all of the buffered data for the terminal. Setting Tc smaller will result in quicker handoffs, as described below. Setting Tc too small may reduce the capacity of the system during non-handoff use.

The upper bound B is then determined as follows:

$$B=\alpha RTc.$$

In the above equation, $\alpha R$ is the average available throughput of a user. That amount multiplied by Tc will give the amount of data which will always be transmittable during the clear-up time Tc assuming no further problems arise.

Each relay maintains knowledge of the number of packets buffered for a given mobile terminal at any given instant and is capable of knowing when the upper boundary is exceeded. However, since it is not possible to have instantaneous signalling between the relay and the BTS, in preferred embodiments the relay alerts the BTS when the buffer status of the terminal exceeds some smaller value, for example 75% of the upper bound. This will allow time for signalling to take place between the BTS and the relay. Preferably, signalling is performed using layer 2 signalling messages between the relay and the BTS.

A very particular formula for determining an upper bound B has been provided above. As described below, the objective of this is to allow the relay to transmit any data in its buffer before the hand-off is complete. Thus, more generally, any flow control method implemented between the BTS and the relay which results in there being enough time to empty the relay buffer prior to handing off to another transceiver can be implemented. Various example flow control methods will now be described.

In a first example flow control method, the relay reports the buffer status to the base station periodically. This will allow a tight control over the amount of buffer data but involves a high overhead to repeatedly transmit the buffer status. The buffer status might for example consist of the current amount of data or packets buffered.

In a second method, two thresholds for the buffer amount are set. One of the thresholds is a "stop point" and the other is a "resume point". When the buffer content reaches the stop point, the relay reports to the base station that this has occurred. When the buffer amount drops to the resume point, this is again reported to the base station. The base station will stop transmitting new data between receipt of the stop point report and the resume point report. This has the advantage of lower overhead than the first method described above.

In a third method, the relay sends a report when the buffer amount reaches a first stop point. The base station response to this by stopping transmission to the particular relay for that user for some number of frames which may or may not be fixed, for example N frames. After this wait, the base station automatically starts to transmit without receipt of a further report from the relay. If after resuming, the relay detects that its buffer status is above the stop point, a further report is sent back to the base station and the base station stops transmitting. This results in a low overhead still than the two above described methods.

In a fourth method, an estimate of $\alpha R_k'$ is made for each terminal. The relay periodically reports this throughput and the base station on the basis of this provides data to the relay approximately following the expected throughput. Ideally this should result in the buffer not becoming over filled in the relay. This has very low overhead but has increased complexity at the base station side.

Even more generally, the method involves at a relay, receiving packets over a first wireless hop forming part of a multi-hop communications path; at the relay, buffering the packets for transmission on a second wireless hop forming part of the multi-hop communications path; at the relay, transmitting the packets on the second wireless hop; and performing flow control over the first wireless hop to limit an amount buffered for transmission on the second wireless hop.

In a first method, performing flow control over the first wireless hop to limit an amount buffered for transmission on the second wireless hop comprises: the relay periodically reporting a buffer status an upstream transmitter of the packets; the upstream transmitter transmitting the packets as a function of the buffer status so as to limit the amount buffered.

In a second method, performing flow control over the first wireless hop to limit an amount buffered for transmission on the second wireless hop comprises: when the amount buffered reaches a stop point, the relay reporting that this has occurred to an upstream transmitter of the packets; when the amount buffered drops to a resume point, the relay reporting that this has occurred to the upstream transmitter of the packets; the upstream transmitter refraining from transmitting new packets to the relay in respect of the multi-hop communications path between receipt of the stop point report and the resume point report.

In a third method, performing flow control over the first wireless hop to limit an amount buffered for transmission on the second wireless hop comprises: the relay sending a first report to an upstream transmitter of the packets when amount buffered reaches a first stop point; in response to the first report, the upstream transmitter refraining from transmitting new packets for some time and then automatically resuming transmitting new packets; if after resuming, the relay detects that the amount buffered is still above the stop point, the relay sending a second report to the upstream transmitter in response to which the upstream transmitter stops transmitting new packets.

In a fourth method, performing flow control over the first wireless hop to limit an amount buffered for transmission on the second wireless hop comprises: the relay maintaining an estimate of an expected throughput for the second wireless hop and periodically reporting this to an upstream transmitter of the packets; the upstream transmitter of the packets transmitting packets to the relay approximately following the expected throughput.

Figure 5:
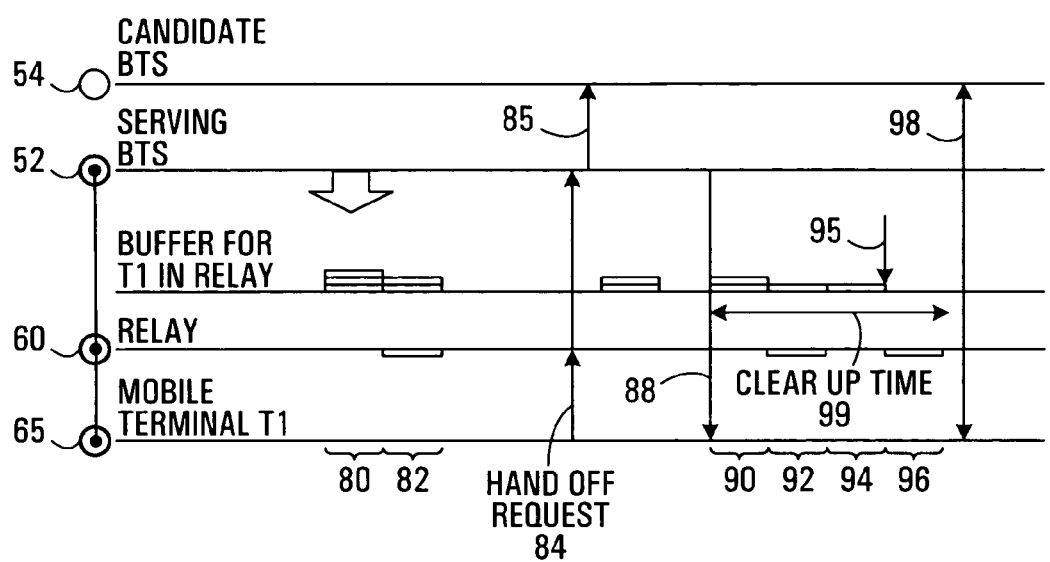
FIG. 5 is an example transmission scenario showing flow control between the relay and BTS, as provided by an embodiment of the invention.

Referring now to FIG. 5, shown is a detailed signalling example involving the network elements in the example network of FIG. 4. For the purpose of this example, it is assumed that BTS 52 is the serving BTS, BTS 54 is a candidate BTS, and that a terminal 65 is communicating via relay 62 with the serving BTS 52. During a first transmission interval 80, the serving BTS is transmitting packets to the relay 60 which are buffered. At transmission interval 82, a packet is shown being transmitted from the relay 60 to the terminal 65. A handoff request is shown at 84. This is sent from the terminal 65 to the relay 60 and then from the relay 60 on to the serving BTS 52. This information is also sent to the candidate BTS 54 as indicated at 85. However, typically this would be sent via some other channel, for example via the BSC of FIG. 4. After receiving the handoff request, the BTS 52 stops sending any more data to the terminal's relay 60. A handoff confirmation is generated at 88. In a centralized system, a higher component such as a BSC (base station controller) may generate the handoff confirmation 88. Alternatively, it can be generated by the serving BTS as shown in FIG. 5. Following this, the relay 60 continues to transmit the contents of its buffer towards the terminal 65. This is shown during transmission intervals 92, 96. The buffer becomes empty as indicated at 95. At 98, the candidate BTS 54 becomes the serving BTS and starts to communicate with the terminal 65. The amount of data in the data buffer is capped to an upper bound, for example the upper bound described above. However, more generally the flow control is implemented so that the buffer has time to clear-up before the candidate BTS 54 becomes the serving BTS. A clear-up time 99 is indicated in FIG. 5. The buffer is expected to be emptied after expiry of the clear-up time 99. When the BTS sends the handoff confirmation 88 to the terminal, it indicates an "action time" after which the handoff will actually occur. The action time is set to be longer than the amount of time allocated to clear-up the buffer, namely Tc. The serving BTS 52 also indicates to the candidate BTS 54 the first packet sequence number for synchronization purposes. Since the serving BTS 52 knows the last packet that it transmitted to the relay 60, the next packet will be the first packet to be transmitted by the candidate BTS 54. The first packet sequence number is used to indicate to the candidate BTS 54 what this first packet is. Any appropriate mechanism of informing the candidate BTS of the next sequence number can be employed. Preferably, after the decision to perform a handoff has been made, but before the occurrence of the action time, the relay 60 gives higher priority to the particular terminal being handed off. This assigns as much resources as possible to the terminal without impairing the QoS of other terminals so that as much of the terminal's buffered data can be transmitted to the terminal during this time as possible.

Preferably, packets are multicast to the serving BTS and to BTSs which are handoff candidates. If this is done then the new serving BTS can start transmitting immediately after handoff since it will have the packets. In embodiments with multicast, the candidate BTS will have the packets before and after the first packet it will transmit. In non-multicast, the system may simply start sending the candidate BTS packets starting at the first packet it needs to transmit. In these other methods there may be a slight scheduling delay when switching to a new base station. Multicasting can be done from a central device to an active set of base stations, or to an anchor base station that forwards the packets to candidate base stations.

Transitions between communicating directly with the BTS and communicating indirectly with the BTS via the relay can be accommodated. Preferably, when a transition is made from the relay to the BTS or vice versa, this is instantaneous meaning a first packet may be sent directly, and a next packet via the relay or vice versa. As described below preferably the mobile terminal is adapted to ignore gaps in packet sequence to allow them to be filled.

Figure 6:
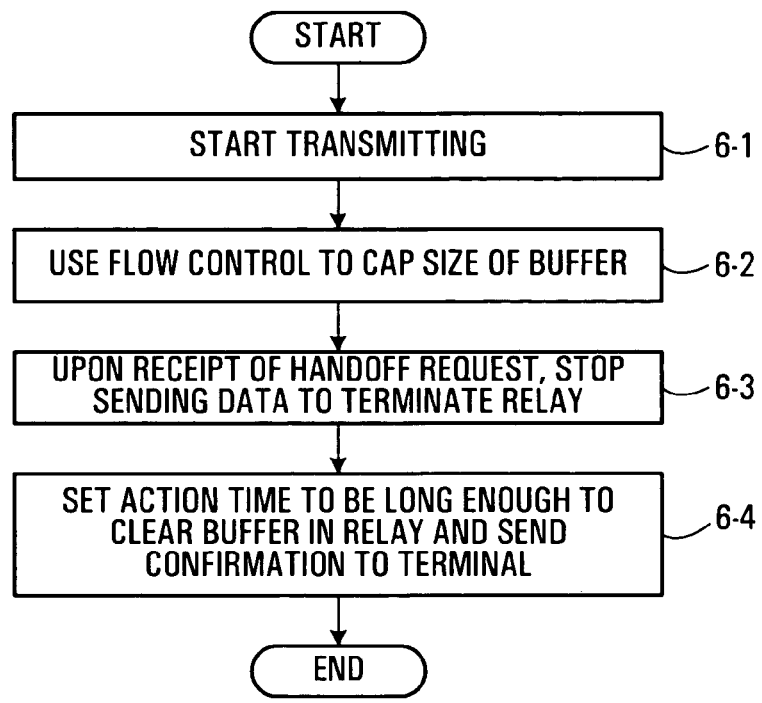
FIG. 6 is a flowchart of functionality executed in a BTS, in accordance with an embodiment of the invention.

FIG. 6 is a flow chart of a method provided by an embodiment of the invention for implementation in a BTS. The method begins at step 6-1 with the start of transmitting to a relay. This can be the very start of a session to a mobile terminal, or alternatively can indicate the start of transmitting following a handoff to that particular BTS. At step 6-2, flow control is implemented to cap the size of the buffer in the relay being used by the BTS. At step 6-3, upon receipt of a handoff request, the BTS stops sending data to the terminal's relay. An action time is set, for example by the BTS or BSC, to be long enough to clear-up the buffer in the relay, as indicated at step 6-4. This step does not have to be implemented in the BTS. For example the buffer clear-up time might be a predetermined value, or this value can be determined elsewhere. The action time is also sent to the terminal in a confirmation message. In another embodiment, the handoff is instigated by the network. In this case, the method of FIG. 6 applies with the exception that step 6-3 involves receiving a handoff request from a control entity, or autonomously making the handoff decision.

Figure 7:
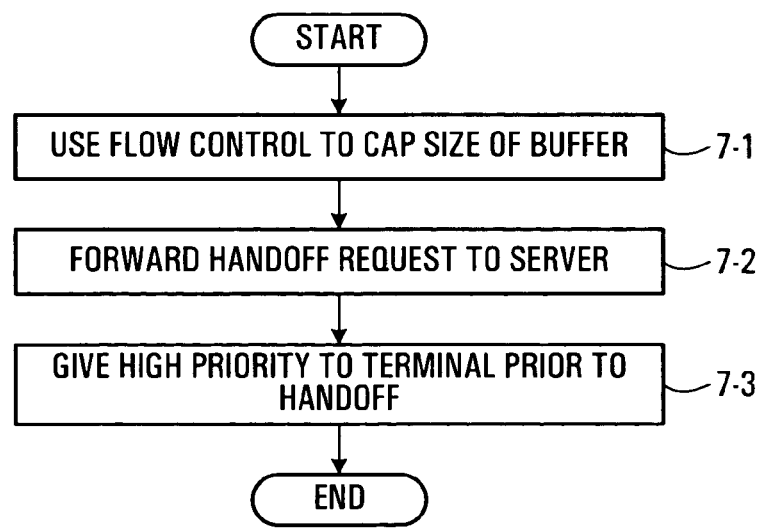
FIG. 7 is a flowchart of functionality implemented in a relay, in accordance with an embodiment of the invention.

FIG. 7 is a flowchart of a method implemented in a relay in accordance with another embodiment of the invention. The method starts at step 7-1 with the use of flow control to cap the size of the buffer and inform the BS of the buffer status. At step 7-2, the relay receives a handoff request from a mobile terminal, and forwards this on to the BTS. At step 7-3, the relay empties out its buffer, preferably giving higher priority to the terminal prior to handoff.

The functionality and embodiments described thus far has focused on the behaviour of the relay and the BTS to solve the handoff problem. Preferably, in some embodiments the behaviour of the terminal is also modified to improve performance and capacity and to solve the unnecessary NACK problem. This will be illustrated first by way of example with reference to FIG. 8. This example uses the same BTS 52, relay 60 and terminal 65 used in the previous examples. A packet P1 100 is shown being transmitted from the BTS 52 directly to terminal 65. Sometime later, packets P2, P3 102 are shown transmitted from the BTS 52 to the relay 60. Packet P2 104 is then shown transmitted by the relay 60 to the terminal 65. Sometime later, the BTS 52 transmits a packet P4 106 directly to the terminal 65 prior to relay 60 having transmitted packet P3. At this point, the terminal 65 will detect a gap in the packet flow. In conventional systems, the terminal would immediately send an RLP NACK. However, in this embodiment, rather than sending an RLP NACK, the terminal sets a clear-up time 112 during which it is willing to wait for the gap in the packet flow to be filled. Thus, sometime later the BTS is shown transmitting packet P5 112 to the terminal 65. Sometime later, the relay 60 sends packet P3 114 to the terminal 65. The terminal 65 now fills in the gap in its packet flow. At this point, the terminal sends the packets P3 through P5 to upper protocol layers in the terminal. Thus generally, when a terminal receives a packet from a BTS with a sequence number higher than expected, the terminal should wait before issuing an RLP NACK preferably for a time equal to Tc. More generally still, when a terminal detects a gap in a packet flow, it should wait for some amount of time before transmitting a message to indicate that the gap has occurred.

Figure 8:
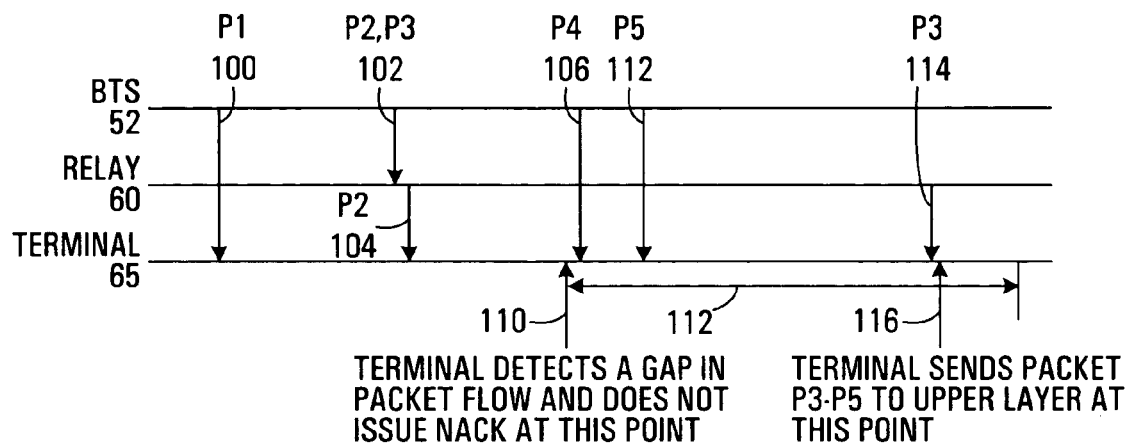
FIG. 8 is a packet flow diagram showing how packet re-ordering is achieved in accordance with an embodiment of the invention so as to avoid unnecessary NACKs.
Figure 9:
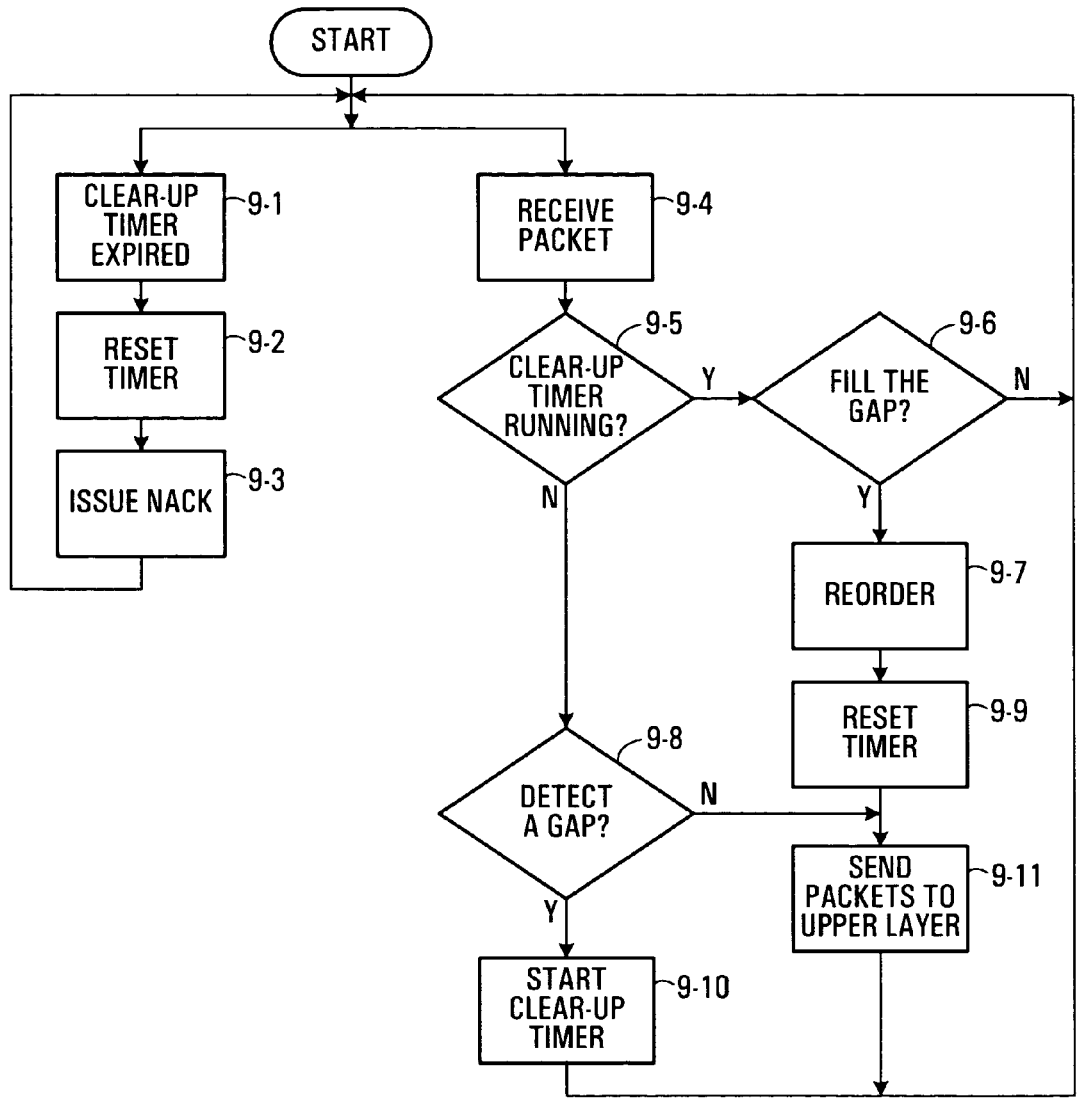
FIG. 9 is a block diagram of functionality implemented by a mobile terminal in accordance with another embodiment of the invention.

FIG. 9 is a flowchart of behaviour of a mobile terminal to implement a method such as exemplified in FIG. 8. The method begins either at step 9-1 with the expiry of the clear-up timer, or at step 9-4 with the receipt of a packet. After receipt of a packet, if the clear-up timer is running, yes path step 9-5, then a determination is made at step 9-6 of whether or not the received packet fills the gap. If it does not fill the gap then the method returns to either step 9-1 or 9-4. If on the other hand, the packet does fill up the gap, yes path step 9-6, then the packets are re-ordered at step 9-7, the time is reset at step 9-9, and the packets are sent to the upper layer at step 9-11. If on the other hand, the clear-up timer is not running, no path step 9-5, then a gap may be detected at step 9-8. If no gap is detected, no path step 9-8, then the packets are sent to the upper layer at step 9-11. On the other hand, if a gap is detected, then a clear-up timer is started at step 9-10.

In the event that the clear-up timer does expire, and as such step 9-1 occurs, the timer is reset at step 9-2, and a NACK is issued at step 9-3. It can be seen that the only circumstance under which the NACK is issued is if a gap in the packet sequence is detected, and subsequent to that gap being detected the clear-up timer has expired without the gap being filled.

In the flowchart of FIG. 9, it is assumed that multiple gaps can be detected, and that for each gap that is detected a respective clear-up time is maintained. If a given gap is not detected within this respective clear-up time, then the NACK is generated. In a simpler implementation, only a single gap is tracked, and that single gap has a single clear-up time within which the continuity of numbering of received packets must be established notwithstanding whether or not there might have been additional gaps created after the initial gap.

Figure 10:
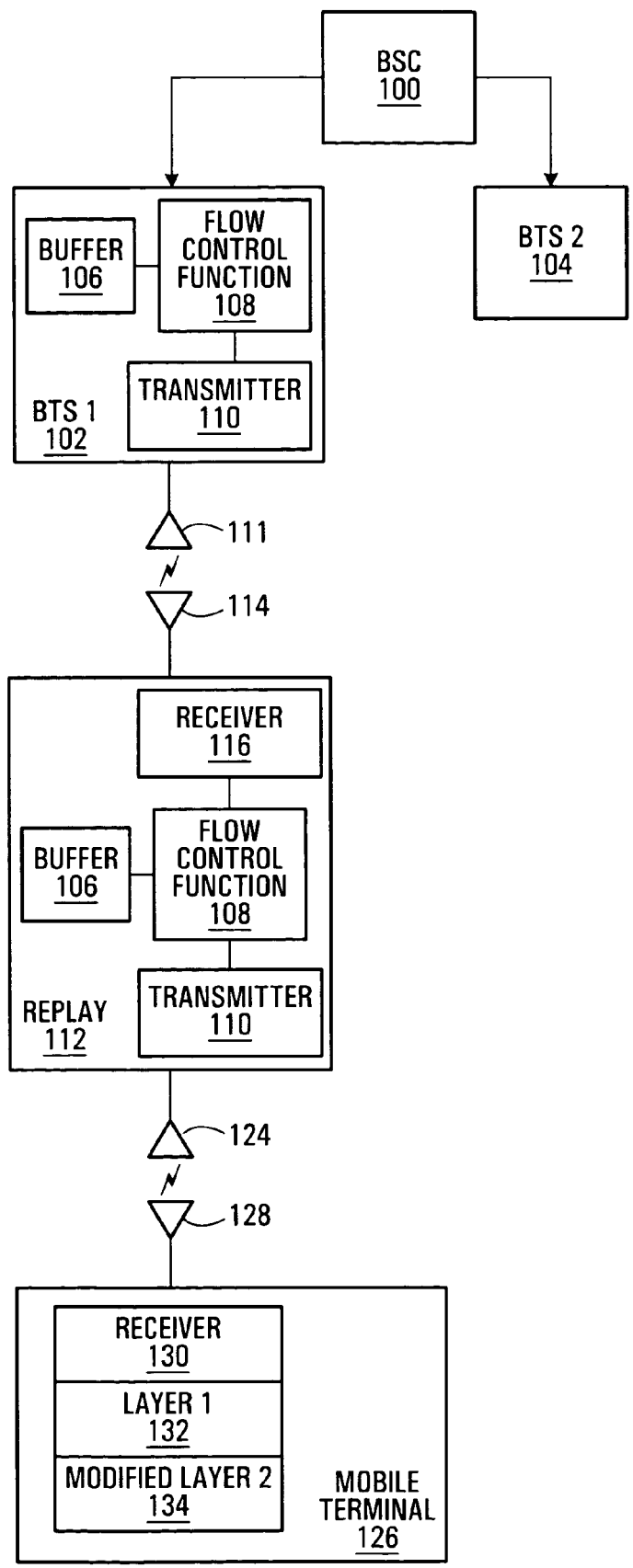
FIG. 10 is a block diagram of a base station, relay and mobile terminal.

Referring now to FIG. 10, shown is a block diagram of an example system implementation for realizing the above described methods. The system comprises a base station controller (BSC) 100 communicating with two BTSs, BTS1 102 and BTS2 104. A relay 112 is shown for extending the coverage area of BTS1 102. It is to be understood that a given system might include further BTSs, and any of the BTSs might include a relay or relays to extend their coverage area. Also shown is a single mobile terminal 126 communicating with BTS1 102 via the relay 112. Of course the number of mobile terminals in a given system will vary in an ongoing manner. The internal details of BTS1 102 are shown at a very high level. It is also noted that the functionality shown in FIG. 10 is specific to downlink communications. However, most implementations would also include the capability to communicate in the opposite direction from the mobile terminal up to the BTS. The BTS1 102 has a transmitter 110 and transmit antenna 111. It is to be understood that any appropriate antenna technology can be employed. There might be multiple antennas for example or just a single antenna. Furthermore, a given BTS might be a multiple sector BTS in which case the functionality for each sector is considered a respective transceiver. A flow control function 108 is shown. This is simply responsible for interacting with the relay to cap the size of the buffer in the relay. The BTS1 102 also has a buffer 106. This is for buffering packets received from the BSC 100 prior to their transmission to the mobile terminal 126 either directly or via the relay 112. Also, in some embodiments packets are multicast to all base stations which are either actively serving a given mobile terminal, or are a candidate for handoff for the given mobile terminal. Thus, if BTS2 104 is a candidate for handoff, then packets would be multicast to both BTS1 102 and BTS2 104 for the mobile terminal 126. A particular arrangement of the functions in the BTS1 102 has been shown. It is to be understood that these functions can be implemented in any suitable combination of hardware, software, firmware, etc. Also, while they are shown as distinct functional entities, they may be implemented as a smaller or larger number of distinct functional entities. The BTS would also of course include much other functionality not shown.

The relay 112 is shown to have an antenna 114 for communicating with the BTS1 102, and an antenna 124 for communicating with mobile terminals such as mobile terminal 126. Depending upon the technology used to communicate between BTS1 102 and the relay 112, the number of antennas, and the shape, size and structure of the antenna 114 can be modified accordingly. The same applies for antenna 124. It is noted that the link between BTS1 102 and relay 112 may be implemented to be a higher capacity link and more reliable than the link emanating from antenna 124. The relay 112 is shown to have a receiver 116 and a transmitter 122. There is a flow control function 120 and a buffer 118. The buffer 118 buffers packets between their receipt by the receiver 116 and their transmission by the transmitter 122. The flow control function 120 in Cupertino with the flow control function 108 and the BTS1 102 caps the size of the buffer 118. The functionality of the relay 112 can be implemented in any suitable combination of hardware, software and firmware, etc. A particular layout of the functional entities in a relay 112 has been shown. More generally, this functionality can be provided in a smaller or larger number of functional entities.

The mobile terminal 126 is shown to include an antenna 128. As for the other components described above, depending upon the technology being employed for the wireless communications to the mobile terminal 126, any suitable number and design of antennas 128 can be employed. The mobile terminal 126 has a receiver 130. The mobile terminal 126 is also shown to include layer 1 132 and modified layer 2 134 of its protocol stack. The mobile terminal would typically include other layers and other functions not shown. The modified layer 2, in preferred implementations, does not generate the layer 2 NACK immediately upon detecting a gap in a packet flow, but rather waits for some amount of time in order to allow time for the gap to be filled.

Numerous modifications and variations of the present invention are possible in light of the above teachings. It is therefore to be understood that within the scope of the appended claims, the invention may be practiced otherwise than as specifically described herein.

We claim:

1. A relay transceiver comprising:
a receiver adapted to receive packets on a first wireless link collectively destined for at least one mobile terminal;
a transmitter adapted to transmit the packets on a second wireless link;
a buffer adapted to buffer the packets between their receipt and transmission; and
a flow control function adapted to:
participate in flow control over the first wireless link to limit an amount buffered in the relay transceiver for a given mobile terminal; and
transmit a message when a number of packets reaches a threshold selected to substantially guarantee the buffer will be emptied within a predetermined time, wherein the threshold is based on $\alpha R Tc$, where Tc is the predetermined time, R is a minimum data rate on the second wireless link, and $\alpha$ is an average availability of the second wireless link for transmitting to the given mobile terminal.

2. The relay transceiver according to claim 1 wherein the flow control function is further adapted to allow the buffer to be emptied prior to completing a handoff.

3. The relay transceiver according to claim 1 wherein the flow control function is further adapted to allow the buffer to be emptied prior to a mobile terminal generating a layer 2 NACK, the relay transceiver being adapted for use with mobile terminals that are configured to delay generating layer 2 NACKs for a given amount of time.

4. A system comprising:
a first transceiver;
a relay transceiver in communication with the first transceiver, wherein the first transceiver is adapted to transmit a plurality of packets to the relay transceiver on a first wireless link, each packet of the plurality of packets being destined for a mobile terminal and the relay transceiver is adapted to:
receive the plurality of packets from the first transceiver on the first wireless link;
buffer the plurality of packets;
transmit the plurality of packets on a second wireless link; and
transmit a message to the first transceiver when an amount of packets buffered for a mobile terminal reaches a predetermined threshold that guarantees a relay buffer will be emptied within a predetermined time, wherein the predetermined threshold is based on $\alpha R Tc$, where Tc is the predetermined time, R is a minimum data rate on the second wireless link, and alpha is an average availability of the second wireless link for transmitting to the mobile terminal such that the first transceiver and the relay transceiver perform flow control to limit the amount of packets buffered in the relay transceiver for the mobile terminal.

5. The system according to claim 4 wherein:
in response to receiving the message, the first transceiver stops transmitting packets to the relay transceiver for the mobile terminal.

6. The system according to claim 4 further adapted to:
initiate a handoff to a second transceiver;
executing the handoff after giving the relay transceiver time to empty its relay buffer.

7. The system according to claim 6 wherein the flow control is performed to substantially guarantee the relay buffer will be able to be emptied prior to completing the handoff.

8. The system according to claim 4 for use with the mobile terminal adapted to delay sending a layer 2 NACK due to packet mis-ordering, the system further adapted to transmit one of a pair of consecutive packets for the mobile terminal directly from the first transceiver, and to transmit a second of the pair of consecutive packets from the first transceiver via the relay transceiver;
wherein a threshold is selected to substantially guarantee the relay buffer can be emptied before the mobile terminal is expected to generate the layer 2 NACK due to mis-ordering of received packets.

9. A method of operating a relay in a multi-hop wireless network having a base transceiver station in communication with the relay, the method comprising:
receiving packets over a first wireless hop forming part of a multi-hop communications path in the multi-hop wireless network from the base transceiver station;
buffering the packets for transmission on a second wireless hop forming part of the multi-hop communications path, wherein the packets are buffered in a buffer at the relay;

transmitting the packets on the second wireless hop from the relay to a mobile terminal in the multi-hop wireless network;

determining a threshold that allows emptying of the relay buffer within a predetermined time, wherein the threshold is based on $\alpha R T_c$, where $T_c$ is the predetermined time, R is a minimum data rate on the second wireless hop, and $\alpha$ is an average availability of the second wireless hop for transmitting to the mobile terminal performing flow control over the first wireless hop to limit an amount of packets buffered for transmission on the second wireless hop based on the threshold.

10. The method according to claim 9 wherein performing the flow control over the first wireless hop to limit the amount of packets buffered for transmission on the second wireless hop comprises:

the relay periodically reporting a buffer status to an upstream transmitter of the packets;

the upstream transmitter transmitting the packets as a function of the buffer status so as to limit the amount of packets buffered.

11. The method according to claim 9 wherein performing the flow control over the first wireless hop to limit the amount of packets buffered for transmission on the second wireless hop comprises:

when the amount of packets buffered reaches a stop point, the relay reporting that this has occurred to an upstream transmitter of the packets; and when the amount of packets buffered drops to a resume point, the relay reporting that this has occurred to the upstream transmitter of the packets, wherein the upstream transmitter refraining from transmitting new packets to the relay in respect of the multi-hop communications path between receipt of the stop point report and the resume point report.

12. The method according to claim 9 wherein performing the flow control over the first wireless hop to limit the amount of packets buffered for transmission on the second wireless hop comprises:

the relay sending a first report to an upstream transmitter of the packets when the amount of packets buffered reaches a first stop point;

in response to the first report, the upstream transmitter refraining from transmitting new packets for some time and then automatically resuming transmitting new packets; and if after resuming, the relay detects that the amount of packets buffered is still above the first stop point, the relay sending a second report to the upstream transmitter in response to which the upstream transmitter stops transmitting new packets.

13. The method according to claim 9 wherein performing the flow control over the first wireless hop to limit the amount of packets buffered for transmission on the second wireless hop comprises:

the relay maintaining an estimate of an expected throughput for the second wireless hop and periodically reporting the estimate to an upstream transmitter of the packets; and the upstream transmitter of the packets transmitting packets to the relay approximately following the expected throughput.

\* \* \* \* \*

UNITED STATES PATENT AND TRADEMARK OFFICE
CERTIFICATE OF CORRECTION

PATENT NO. : 7,590,064 B1
APPLICATION NO. : 10/894037
DATED : September 15, 2009
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this

Twenty-first Day of September, 2010

David J. Kappos
*Director of the United States Patent and Trademark Office*